US009609495B2

(12) United States Patent
Kotecha et al.

(10) Patent No.: US 9,609,495 B2
(45) Date of Patent: Mar. 28, 2017

(54) CENTRAL INFORMATION MANAGEMENT SYSTEM

(71) Applicant: Verizon Patent and Licensing Inc., Basking Ridge, NJ (US)

(72) Inventors: Lalit R. Kotecha, San Ramon, CA (US); Sergio Aguirre, Southlake, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 778 days.

(21) Appl. No.: 13/678,653

(22) Filed: Nov. 16, 2012

(65) Prior Publication Data

US 2014/0143322 A1    May 22, 2014

(51) Int. Cl.
  *G06F 15/16*    (2006.01)
  *H04W 4/20*    (2009.01)
  *H04W 4/02*    (2009.01)
  *H04L 12/58*    (2006.01)

(52) U.S. Cl.
  CPC ............ *H04W 4/206* (2013.01); *H04L 51/32* (2013.01); *H04W 4/02* (2013.01)

(58) Field of Classification Search
  CPC ...................................................... H04L 51/32
  USPC ........................................................ 709/204
  See application file for complete search history.

(56) References Cited

U.S. PATENT DOCUMENTS 8,745,023 B2 *    6/2014    Libin et al. ................... 707/707

\* cited by examiner

*Primary Examiner* — Adnan Mirza

(57) ABSTRACT

A network device is configured to send information identifying a frequency at which an application, downloaded on a user device, is to send geographic location information to the network device. The network device is configured further to receive personal information associated with a plurality of social networking applications from the application on the user device. The network device is configured further to receive the geographic location information from the application; and send the personal information and the geographic location information to a plurality of social networking servers associated with a plurality of social networking applications.

20 Claims, 9 Drawing Sheets

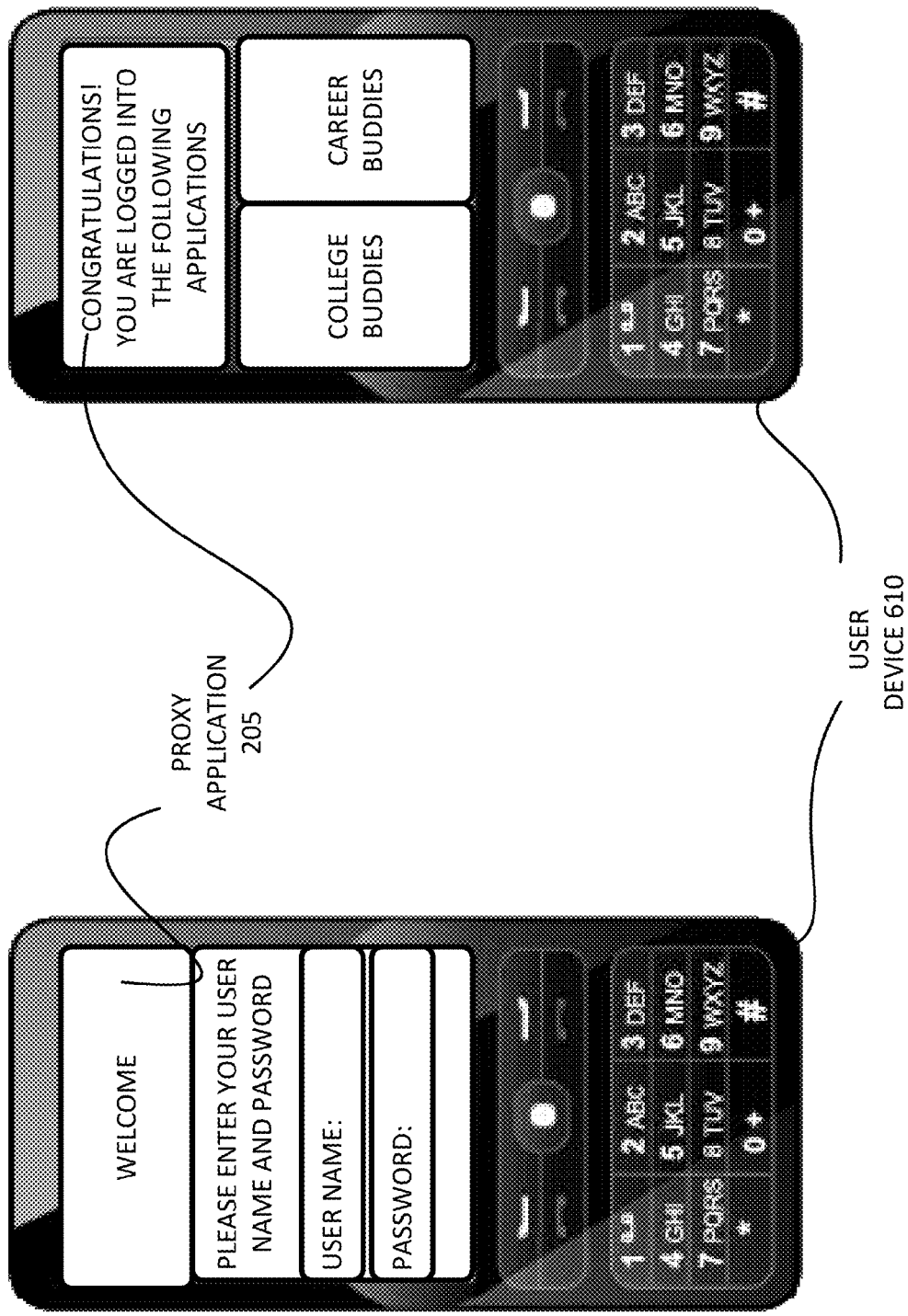

CENTRAL INFORMATION MANAGEMENT SYSTEM

BACKGROUND

A user may use multiple social networking applications on a user device. Each social networking application may receive, at different times, location information of the user device from the user device. Each social networking application may send the location information, at different times, to a server associated with the social networking application.

BRIEF DESCRIPTION OF DRAWINGS

FIGS. 6A-6D are diagrams of example processes for sending and using personal information and location information.

DETAILED DESCRIPTION OF PREFERRED EMBODIMENTS

The following detailed description refers to the accompanying drawings. The same reference numbers in different drawings may identify the same or similar elements.

Systems and/or methods described herein may permit an application downloaded on a user device to control when location information of the user device can be sent from the user device (through a network) to a network device. The application may also receive personal information (e.g., update messages, photos, etc.) from one or more social networking applications (on user device 210) and may send the personal information to the network device. The network device may receive the location information and the personal information associated with one or more social networking applications. The network device may send the location information to one or more servers associated with the social networking applications and the network device may send the personal information from a social networking application to the respective server of the social networking application. Further, the network device may provide the user with recommendations (e.g., concerning a restaurant, a movie theater, an event, etc.) based on the location information and the personal information.

Figure 1A:
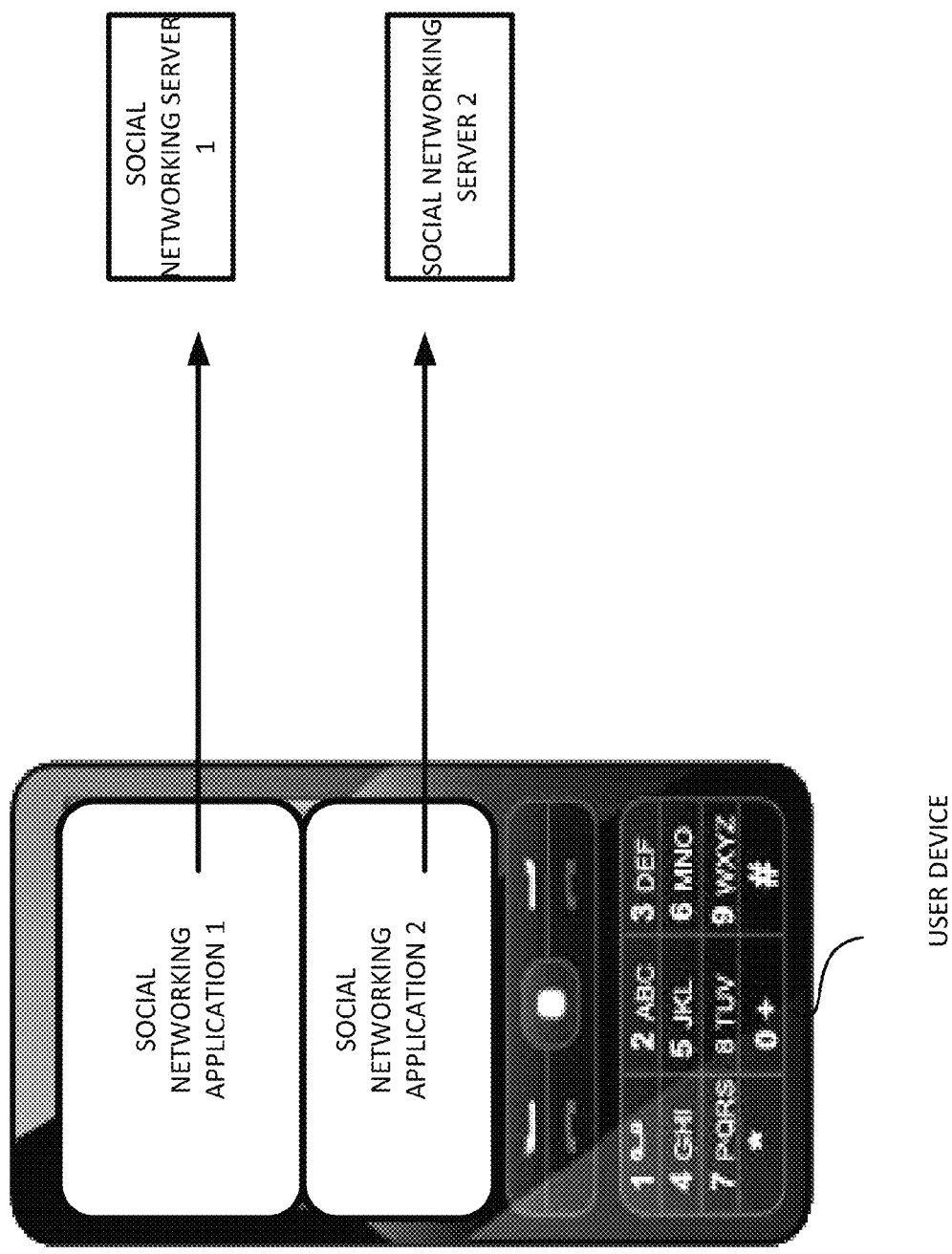
FIGS. 1A-1B are diagrams of an overview of an implementation described herein.
Figure 1B:
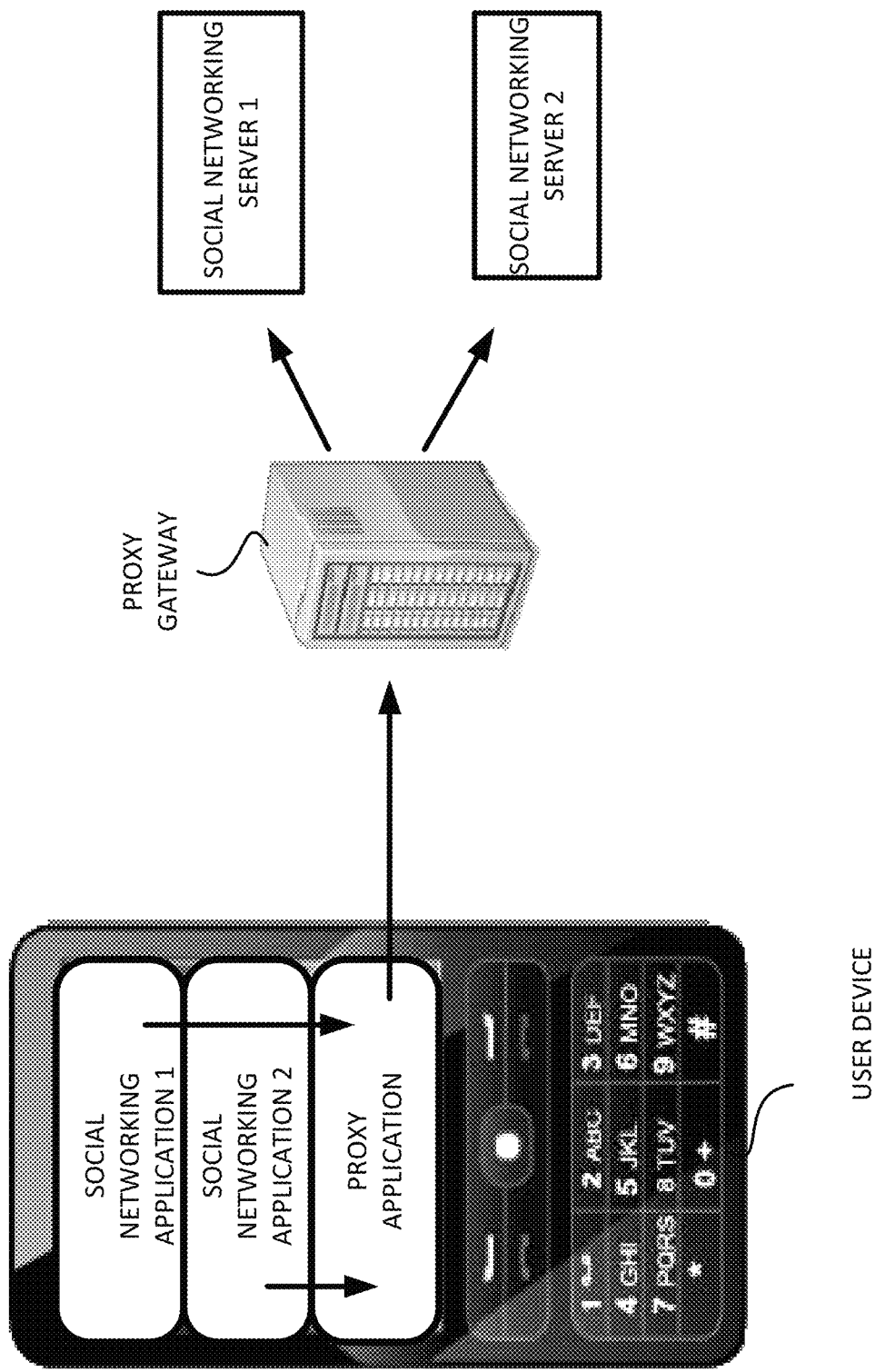

FIGS. 1A-1B are diagrams of an overview of an implementation described herein. FIG. 1A shows a user device, social networking server 1, social networking server 2, social networking application 1, and social networking application 2. As shown in FIG. 1A, assume that a user, of the user device, is using social networking application 1 and social networking application 2 on the user device. Assume that social networking application 1 obtains the location information (of the user device) from the user device and sends the location information to social networking server 1 every five seconds. Further, assume that social networking application 2 obtains the location information (of the user device) from the user device and sends the location information to social networking server 2 every three seconds.

Additionally, social networking application 1 may send personal information to social networking server 1 and social networking application 2 may send personal information to social networking server 2. The personal information may be any information associated with the user's account with a particular social networking application. This may include wall postings, photos, status updates, user likes/dislikes, demographic information (birthplace of user, current employer, male/female, etc.), and/or any other type of information that may be sent from the social networking application to its respective server.

Each time the location information is sent from the user device, this results in the reduction of user device resources, such as draining the battery life of the user device, which may lead to an undesirable user experience.

FIG. 1B shows the devices described in FIG. 1A as well as a proxy gateway and a proxy application on the user device. The proxy application may control when location information of the user device can be sent from the user device through the network. Further, the proxy application permits the user to log into all the social networking applications downloaded on the user device by logging into the proxy application.

Any information that social networking application 1 and social networking application 2 sends from the user device is sent from each social networking application through the proxy application. Assume that the user logs into the proxy application. Upon logging into the proxy application, the proxy application may communicate (based on stored instructions) with social networking server 1 and 2. Social networking server 1 may receive a message that the user is logged into social networking application 1 and social networking server 2 may receive a message that the user is logged into social networking application 2.

With the user logged into the proxy application, the location information and the personal information received by the proxy application is sent, via the network, to the proxy gateway. The proxy gateway is a network device that receives the location information and the personal information from social networking application 1 and social networking application 2 via the proxy application. The proxy gateway may send the location information to social networking application server 1 and social networking application server 2. Further, the proxy gateway send the personal information (received from the proxy application) associated with social networking application 1 to social networking server 1 and the personal information associated with social networking application 2 to social networking server 2.

Assume that the proxy application has stored instructions to send the location information (of the user device) to the proxy gateway every minute instead of multiple social networking applications sending the location information every three or five seconds as described with regard to FIG. 1A. Because user device resources (such as the user device battery) are used by the user device to send information through the network, sending the location information every minute instead of every three and five seconds, the amount of user device resources dedicated to sending location information is reduced. Further, since the location information is sent every minute instead every three and five seconds, the amount of network resources (associated with the network) used to forward the location information is also reduced.

The proxy gateway may also store the location information and the personal information associated with social networking application 1 and social networking application 2 to determine a recommendation (e.g., a service, such as yoga, a business, such as a restaurant, an event, such as a concert, and/or other types of information) which the proxy gateway sends to the proxy application. The proxy application may receive the recommendation and display the recommendation on the user device to the user.

As a result, controlling the frequency of time during which the location information (of the user device) is sent from the user device may reduce the amount of user device resources and/or reduce the amount of network resources being used to send the location information since less location information is being sent from the user device. Further, using a network device (e.g., such as the proxy gateway) to receive information from multiple social networking applications may permit the network to provide recommendations that may be of interest to the user of the user device.

Figure 2:
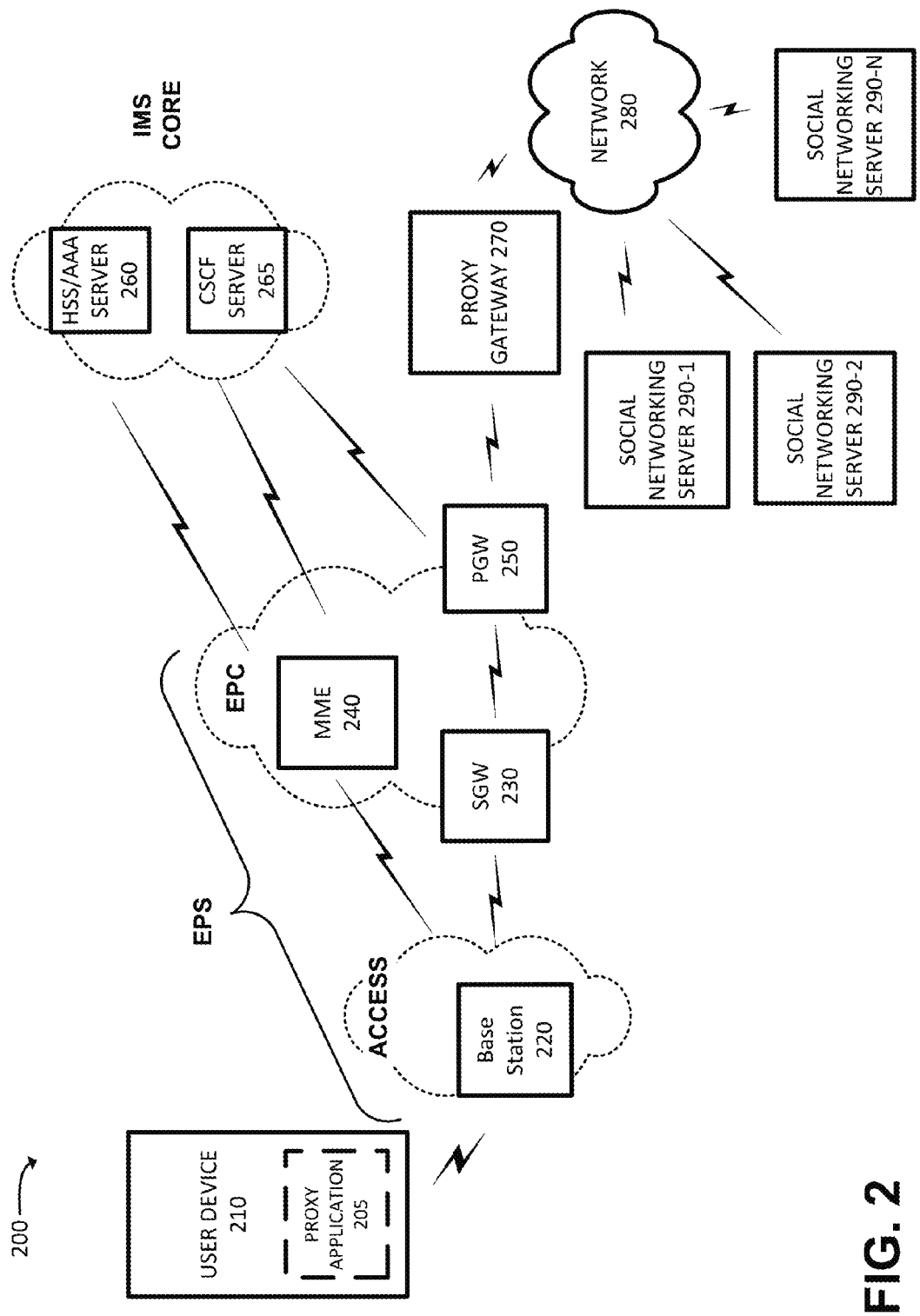
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a proxy application 205, a user device 210, a base station 220, a serving gateway 230 (hereinafter referred to as "SGW 230"), a mobility management entity device 240 (hereinafter referred to as "MME 240"), a packet data network (PDN) gateway 250 (hereinafter referred to as "PGW 250"), a home subscriber server (HSS)/authentication, authorization, accounting (AAA) server 260 (hereinafter referred to as "HSS/AAA server 260"), a call session control function (CSCF) server 265 (hereinafter referred to as "CSCF server 265"), a proxy gateway 270, a network 280, and a social networking servers 290-1, 290-2, . . . , 290-N (N>1) (hereinafter referred to generally as "social networking servers 290," and individually as "social networking server 290").

Environment 200 may include an evolved packet system (EPS) that includes an LTE network and/or an evolved packet core (EPC) that operate based on a third generation partnership project (3GPP) wireless communication standard. The LTE network may be a radio access network (RAN) that includes one or more base stations, such as eNodeBs (eNBs), via which user device 210 communicates with the EPC. The EPC may include SGW 230, MME 240, PGW 250, and proxy gateway 270 that enables device 210 to communicate with network 280 and/or an Internet protocol (IP) multimedia subsystem (IMS) core. The IMS core may include HSS/AAA server 260 and/or CSCF server 265 and may manage authentication, session initiation, account information, a user profile, etc. associated with user device 210. The combination of the access network, the EPC, and the IMS core may be defined as a long term evolution (LTE) network. The access network may include multiple base stations 220, and the EPC may include multiple SGWs 230, MMEs 240, PGWs 250, proxy gateways 270. The IMS core may include multiple HSS/AAA servers 260 and/or CSCF servers 265.

In some implementations, the LTE network, described above, may be replaced with another type of network, such as a network similar to network 280.

Proxy application 205 may include an application that is capable of receiving information from one or more social networking applications downloaded and executing on user device 210. Proxy application 205 may send the information associated with the one or more social networking applications to proxy gateway 270. Proxy application 205 may receive information from one or more social networking applications (associated with one or more social networking servers 290) and may send the information to proxy gateway 270. Proxy application 205 may receive location information, of the user device, from user device 210 and may control when the location information may be sent from proxy application 205 to proxy gateway 270.

User device 210 may include any mobile user device that is capable of communicating with a network (e.g., network 280). For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop, a tablet computer, or any other type of mobile user device.

User device 210 may include a variety of applications such as, for example, a social networking application, a photo sharing application, an e-mail application, a telephone application, a camera application, a video application, a multi-media application, a music player application, a visual voicemail application, a contacts application, a data organizer application, a calendar application, an instant messaging application, a texting application, a web browsing application, a location-based application (e.g., a global positioning system ("GPS")-based application), a blogging application, and/or other types of applications (e.g., a word processing application, a spreadsheet application, etc.).

Base station 220 may include one or more network devices that receive, process, and/or transmit traffic, such as audio, video, text, and/or other data, destined for and/or received from user device 210. In an example implementation, base station 220 may be an eNB device and may be part of the LTE network. Base station 220 may receive traffic from and/or send traffic to network 280 via SGW 230 and PGW 250. Base station 220 may send traffic to and/or receive traffic from user device 210 via an air interface. One or more of base stations 220 may be associated with a RAN, such as the LTE network.

SGW 230 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 230 may, for example, aggregate traffic received from one or more base stations 220 and may send the aggregated traffic to network 280 via PGW 250. In one example implementation, SGW 230 may route and forward user data packets, may act as a mobility anchor for a user plane during inter-base station handovers, and may act as an anchor for mobility between LTE and other 3GPP technologies.

MME 240 may include one or more network devices that gather, process, search, store, and/or provide information in a manner described herein. For example, MME 240 may perform operations associated with a handoff to and/or from the EPS. MME 240 may perform operations to register user device 210 with the EPS, to hand off user device 210 from the EPS to another network, to hand off user device 210 from the other network to the EPS, and/or to perform other operations. MME 240 may perform policing operations for traffic destined for and/or received from user device 210.

PGW 250 may include one or more data processing and/or traffic transfer devices, such as a gateway, a router, a modem, a switch, a firewall, a NIC, a hub, a bridge, a proxy server, an OADM, or some other type of device that processes and/or transfers traffic. PGW 250 may, for example, provide connectivity of user device 210 to external packet data networks by being a traffic exit/entry point for user device 210. PGW 250 may perform policy enforcement, packet filtering, charging support, lawful intercept, and packet screening. PGW 250 may also act as an anchor for mobility between 3GPP and non-3GPP technologies.

HSS/AAA server 260 may include one or more network devices, or other types of computation or communication devices, that gather, process, search, store, and/or provide information in a manner described herein. For example, HSS/AAA server 260 may manage, authenticate, update, and/or store, in a memory associated with HSS/AAA server 260, profile information associated with user device 210 that identifies applications and/or services that are permitted for and/or accessible by device 210, bandwidth or data rate thresholds associated with the applications or services, information associated with a user of user device 210 (e.g., a username, a password, a personal identification number (PIN), etc.), rate information, minutes allowed, and/or other information. Additionally, or alternatively, HSS/AAA server 260 may include a device that performs authentication, authorization, and/or accounting (AAA) operations associated with a communication session with user device 210.

CSCF server 265 may include one or more network devices, or other types of computation or communication devices, that gather, process, search, store, and/or provide information in a manner described herein. CSCF server 265 may process and/or route calls to and from user device 210 via the EPC. For example, CSCF server 265 may process and manage sessions that are associated with audio communications, multimedia calls, video streaming communications, and/or other types of communications that are received from network 280, and that are destined for user device 210. In another example, CSCF server 265 may process and manage sessions (as described above) received from user device 210, that are destined for network 280.

Proxy gateway 270 may include one or more network devices that may receive information, from proxy application 205, associated with one or more social networking applications downloaded on user device 210. Proxy gateway 270 may receive location information of user device 210 from proxy application 205. Proxy gateway 270 may send the location information to one or more social networking servers 290 associated with the one or more social networking applications. Proxy gateway 270 may send information associated a particular social networking application (on user device 210) to a particular social networking server 290 that is associated with the particular social networking application. Proxy gateway 270 may use the location information and the information associated with the one or more social networking applications to determine recommendations for the user of user device 210.

Network 280 may include one or more wired and/or wireless networks. For example, network 280 may include a cellular network, a public land mobile network (PLMN), a second generation (2G) network, a third generation (3G) network, a fourth generation (4G) network, a fifth generation (5G) network, and/or another network. Additionally, or alternatively, network 280 may include a local area network (LAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, and/or combination of these or other types of networks.

Social networking server 290 may include one or more network devices that provide a social networking application that may be used on user device 210. Social networking server 290 may provide and/or interface with a social networking application, such as Facebook, Foursquare, Loopt, and/or a service related to the social networking application. Social networking server 290 may provide a social networking application that can be used on user device 210 to communicate any media stream, such as a video stream, an audio stream, a textual stream, and/or any other type or form of content. Social networking server 290 may provide a social networking application that includes services, such as games, scripts, and/or messaging services that may be used on device 210.

The quantity of devices and/or networks, illustrated in FIG. 2 is provided for explanatory purposes only. In practice, there may be additional devices and/or networks; fewer devices and/or networks; different devices and/or networks; and differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
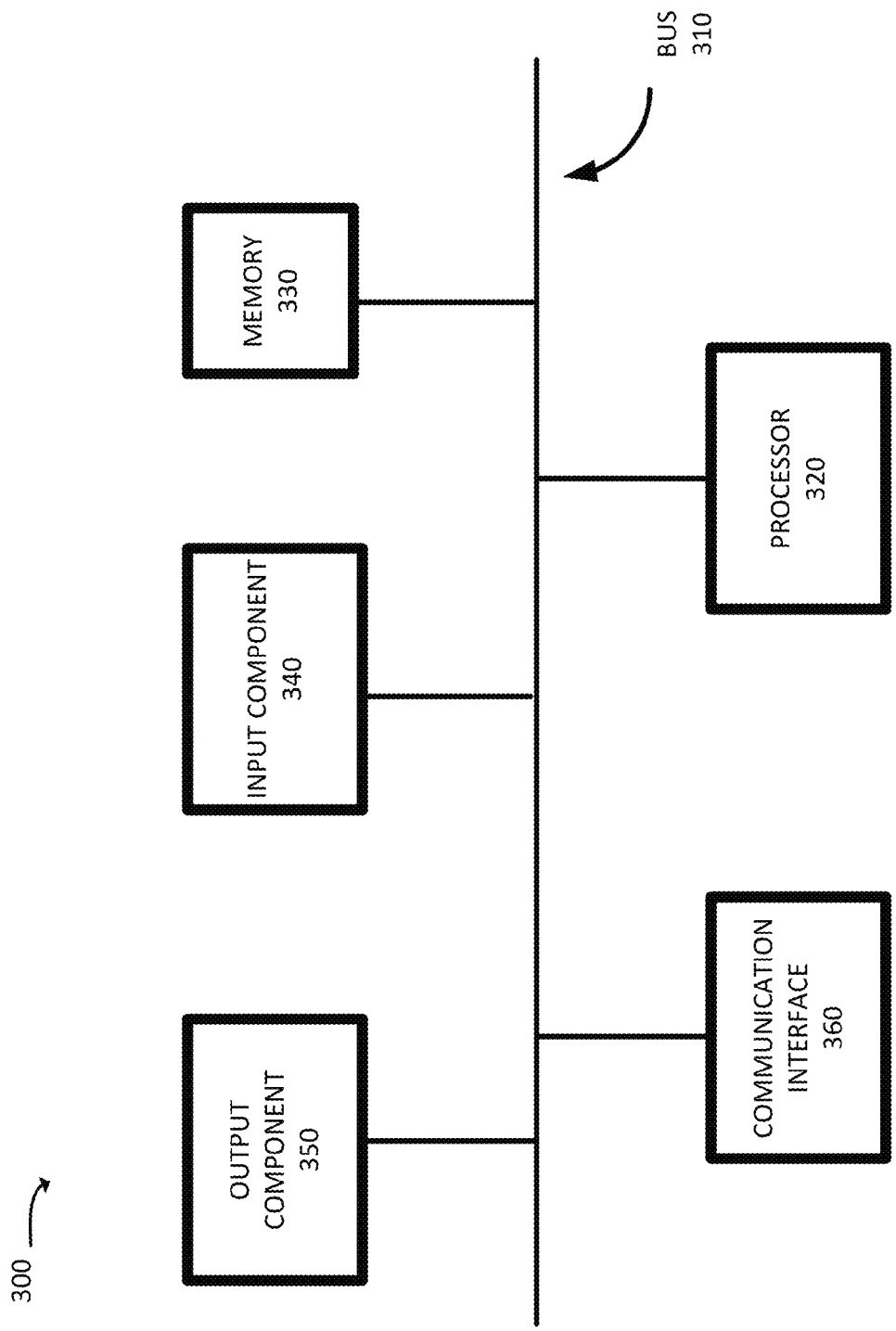
FIG. 3 is a diagram of example components of one or more devices of FIGS. 1A-1B and 2.

FIG. 3 is a diagram of example components of a device 300. Device 300 may correspond to device 210, base station 220, SGW 230, MME 240, PGW 250, HSS/AAA server 260, CSCF server 265, proxy gateway 270, and/or social networking server 290. Additionally, or alternatively, each of device 210, base station 220, SGW 230, MME 240, PGW 250, HSS/AAA server 260, CSCF server 265, proxy gateway 270, and/or social networking server 290 may include one or more devices 300 and/or one or more components of device 300.

As shown in FIG. 3, device 300 may include a bus 310, a processor 320, a memory 330, an input component 340, an output component 350, and a communication interface 360. In other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communication among the components of device 300. Processor 320 may include one or more processors, microprocessors, or processing logic (e.g., a field programmable gate array (FPGA), or an application specific integrated circuit (ASIC)) that interprets and executes instructions. Memory 330 may include any type of dynamic storage device that stores information and instructions, for execution by processor 320, and/or any type of non-volatile storage device that stores information for use by processor 320.

Input component 340 may include a component that permits a user to input information to device 300, such as a keyboard, a keypad, a button, a microphone, a switch, etc. Output component 350 may include a component that outputs information to the user, such as a display, a speaker, one or more light emitting diodes (LEDs), etc.

Communication interface 360 may include any transceiver-like mechanism that enables device 300 to communicate with other devices and/or systems. For example, communication interface 360 may include an Ethernet interface, an optical interface, a coaxial interface, a wireless interface, or the like.

In another implementation, communication interface 360 may include, for example, a transmitter that may convert baseband signals from processor 320 to radio frequency (RF) signals and/or a receiver that may convert RF signals to baseband signals. Alternatively, communication interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communication interface 360 may connect to an antenna assembly (not shown in FIG. 3) for transmission and/or reception of the RF signals. The antenna assembly may include one or more antennas to transmit and/or receive RF signals over the air. The antenna assembly may, for example, receive RF signals from communication interface 360 and transmit the RF signals over the air, and receive RF signals over the air and provide the RF signals to communication interface 360. In one implementation, for example, communication interface 360 may communicate with network 280 and/or devices connected to network 280.

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk, CD-ROM, etc.), or other forms of RAM or ROM. A computer-readable medium may be defined as a non-transitory memory device. A memory device may include memory space within a single physical storage device or memory space spread across multiple physical storage devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
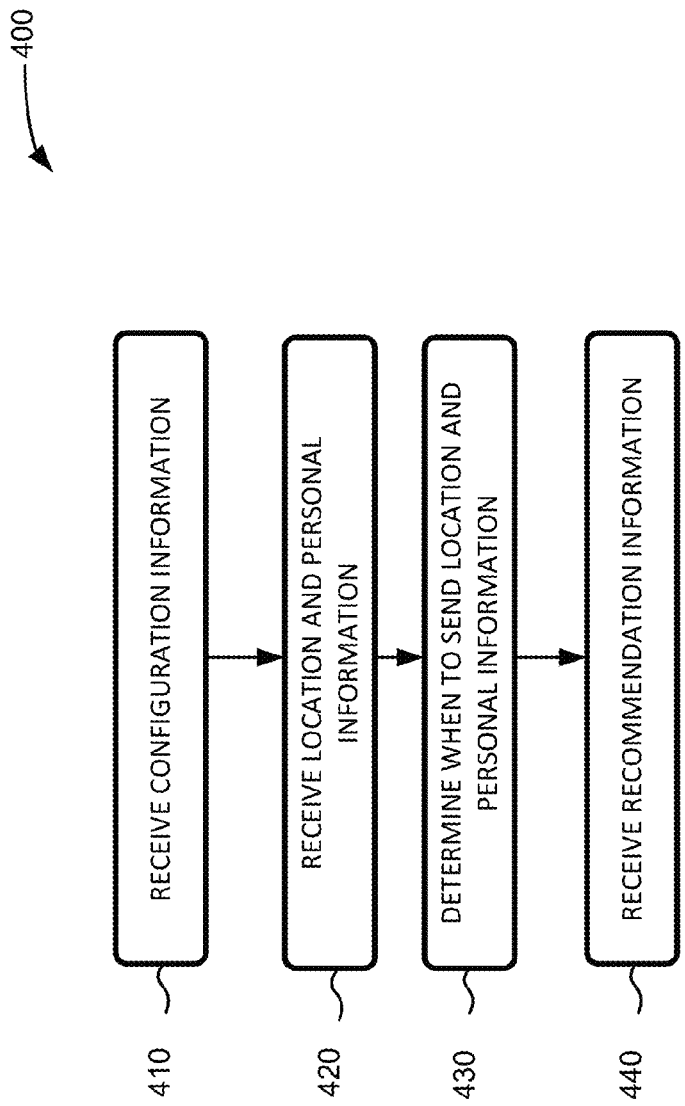
FIG. 4 is a flow chart of an example process for sending information from one or more applications.

FIG. 4 is a flow chart of an example process 400 for sending information from multiple social networking applications. In one implementation, process 400 may be performed by user device 210. In another example implementation, one or more blocks of process 400 may be performed by one or more other devices, such as proxy gateway 270.

Process 400 may include receiving configuration information (block 410). For example, proxy application 205 may receive instructions on what information proxy application 205 is permitted to access. Proxy application 205 may be downloaded on user device 210 prior to the activation of user device 210 and may be implemented in the memory of user device 210. Alternatively, the user may download and install proxy application 205 on user device 210.

Proxy application 205 may display a message to the user (of user device 210) requesting permission from the user for access of location information (of user device 210) and/or personal information from social networking applications, associated with different social networking servers 290, downloaded on user device 210. The location information may be received from user device 210 via a GPS receiver, a radio device, and/or any other device within user device 210 that can provide the location information (e.g., the geographic location) of user device 210.

The message may include information about how proxy application 205 may provide the user with the capability to use login information to obtain admission to multiple social networking applications downloaded on user device 210. The login information may be a user name and password, biometric information (fingerprint information), a unique code, and/or any other type of login information. The login information may be associated with an identifier associated with user device 210, such as the international mobile subscriber identifier (hereinafter referred to as "IMSI"), the mobile subscriber integrated services digital network ("MSISDN"), the mobile device number (hereinafter referred to as "MDN"), or any other device identifier associated with user device 210. The login information may be stored by proxy application 205 for future validations or proxy application 205 may send the login information to a network device (e.g., proxy gateway 270, HSS/AAA server 240, etc.) so that the network device may store and use the login information for future validations.

The message may include information regarding how the user may use proxy application 205 for social networking applications downloaded on user device 210. The message may include a list of applications that the user may use in conjunction with proxy application 205. The user may select one or more social networking applications from the list of social networking applications. For each selected social networking application, the user may provide proxy application 205 particular login information for each selected social networking application. Upon the user entering in the login information for proxy application 205, proxy application 205 may use the particular login information to log into a social networking server 290 associated with a social networking application. Alternatively, upon the user entering in the login information for proxy application 205, proxy application 205 may send the login information to proxy gateway 270 and proxy gateway 270 may store the particular login information associated with a social networking application. Proxy gateway 270 may use that login information to log into a social networking server 290 associated with a social networking application. Social networking server 290 may validate the particular login information associated with a social networking application as if social networking server 290 received particular login information from the user logging into the social networking application.

At a later time the user may decide to no longer use proxy application 205 and the user may deselect social networking applications being used in conjunction with user device 210. For example, the user may use proxy application 205 to act as a proxy application to log into a first social networking application and a second social networking application. At a later time, the user may decide to stop sending information from the first social networking application via proxy application 205. The user may opt-out of using proxy application 205 to receive information from the first social networking application.

The message may include providing the user with the option to configure when the location information may be sent from proxy application 205. For example, the user may be given the option to select the frequency of time (e.g., every 10 seconds, 5 seconds, 2 minutes, etc.) when the location information may be sent from proxy application 205. Alternatively, proxy application 205 may have stored pre-configuration information that instructs proxy application 205 to send information during a particular frequency of time.

Alternatively, proxy application 205 may receive instructions from proxy gateway 270 regarding when proxy application 205 is to receive location information from user device 210 and send the location information to proxy gateway 270. Proxy application 205 may receive additional instructions to change the frequency of time (e.g., change from every 10 seconds to every 5 seconds) at which the location information may be sent from user device 210. Proxy gateway 270 may send the additional instructions based on changes to the amount of network traffic at a particular time (e.g., proxy gateway 270 sends instructions at the busy hour on particular day to send location information every 20 seconds during the busy hour on the particular day).

Alternatively, proxy application 205 may store instructions that when the battery power of user device 210 reaches a certain level (e.g., the battery power is at 50%), then proxy application 205 may automatically change the frequency of time at which the location information may be sent from user device 210.

Alternatively, proxy application 205 may store instructions that when user device 210 is being used at a particular time of the day (e.g., 10:00 a.m., 1:00 p.m., 5:00 a.m., etc.), proxy application 205 may automatically change the frequency of time at which the location information may be sent from user device 210.

The message may include providing the user with options for configuring when recommendation information may be provided to user device 210. The user may be provided with the option to determine when recommendations may be sent to user device 210. The user may have the option to receive recommendations only when the user is using a particular social networking application. The user may have the option to receive recommendations only during a specified time, such as recommendations may only be sent to user device 210 on a particular day (e.g., only on Saturday) and/or at a particular time (e.g., from 9:00 a.m. to 1:00 p.m.). The user may have the option to disable receiving recommendations during a period of time (e.g., the user is going on vacation for two weeks and does not want any recommendations sent during the two week period).

The message may include providing the user with an option regarding how long information (associated with the location and/or personal information) may be stored by proxy gateway 270. The message may include providing the user with the option regarding which information (e.g., photos, status updates, etc.) may be stored by proxy gateway 270. For example, the user may have the option to only permit personal information, associated with a particular social networking application selected by the user, to be stored. Additionally, the user may have the option to permit location information to be stored for a particular period of time (e.g., 1 day, 30 days, 1 hour, etc.).

Process 400 may include receiving location and personal information (block 420). The user may log into proxy application 205 by using valid login information. In one example implementation, proxy application 205 may validate the login information. Proxy application 205 may use particular stored login information (described with regard to block 410) associated with the particular social networking application and send the particular login information to social networking server 290. Since social networking server 290 has information stored regarding validating the particular login information associated with a particular social networking application, social networking server 290 validates the particular login information as if social networking server 290 is receiving the particular login information directly from the social networking application.

In another example implementation, proxy application 205 may send the login information to a network device (e.g., proxy gateway 270). The network device may receive the login information from user device 210, via proxy application 205, validate the login information, and send a message to proxy application 205 that the user is permitted to use proxy application 205. Proxy gateway 270 may use particular stored login information (described with regard to block 410) associated with the particular social networking application and send the particular login information to social networking server 290. Since social networking server 290 has information stored regarding validating the particular login information associated with a particular social networking application, social networking server 290 validates the particular login information as if social networking server 290 is receiving the particular login information directly from the social networking application.

In either of the above example implementations, the social networking application may store information (received from social networking server 290) that the social networking application is to send personal information to proxy application 205. Further, in either of the above example implementations, if the login information is not valid, then the user may still be able to log into one or more social networking applications (associated with one or more social networking servers 290) downloaded on user device 210. The social networking application may communicate with social networking server 290 without using proxy application 205 and/or proxy gateway 270.

With the user logged into proxy application 205, social networking applications (downloaded on user device 210) may send personal information to proxy application 205. The information being sent is based upon the configuration information described with regard to block 410. Additionally, proxy application 205 may request and receive location information from user device 210 based on the configuration information described in block 410. The location information may be received based upon a radio device, a GPS receiver, and/or any other device within user device 210 that can communicate with another device (e.g., a base station, a satellite system, etc.) to receive location information for user device 210.

Process 400 may include determining when to send the location and personal information (block 430). For example, upon receiving the personal information from one or more social networking applications, proxy application 205 may send the personal information to proxy gateway 270.

Proxy application 205 may have instructions that determine when to send location information from user device 210 to proxy gateway 270. The instructions may be received from the user of user device 210, proxy gateway 270, or the instructions may be pre-configured within proxy application 205, as described with regard to block 410. The instructions may, for example, determine that location information is to be sent after a period of time (e.g., send location information every 5 minutes, 10 seconds, 1 minute, etc.) to prevent a large amount of location data from being continuously sent through the network.

Additionally, or alternatively, the instructions may determine that location information is to be sent when one or more of the social networking applications (downloaded on user device 210) are being used. For example, proxy application 205 may send location information only when a first social networking application is being used for an interval of time greater than a threshold level of usage (e.g., the user is using the social networking application for more than 10 minutes, 1 minute, 5 minutes, etc.).

Proxy gateway 270 may receive the location information and the personal information from user device 210, via proxy application 205. Proxy application 205 may communicate with proxy gateway 270 by using an application programming interface (hereinafter referred to as "API"). Proxy gateway 270 may send the location information and the personal information to a particular social networking servers 290 associated with a social networking application (downloaded on user device 210) associated with the particular social networking server 290.

Process 400 may include receiving recommendation information (block 440). For example, proxy application 205 may receive recommendation information from proxy gateway 270. The recommendation information may include recommendations to the user based on the location information and the personal information sent from user device 210 to proxy gateway 270 as described above.

The recommendation information may include information recommending businesses near the user's location (assuming that the user is using user device 210) based on personal information. For example, assume that the personal information relates to books. In this case, the recommendation information may recommend a bookstore within a particular geographic distance (e.g., 2 miles, 1 mile, 3 miles, etc.) of the user's location.

Proxy application 205 may display a message on user device 210. The message may include the recommendation information received from proxy gateway 270. The message may include an option for the user to receive additional information (regarding the recommendation) and an additional option to ignore any further notifications regarding the recommendation.

While a series of blocks has been described with regard to FIG. 4, the blocks and/or the order of the blocks may be modified in other implementations. Further, non-dependent blocks may be performed in parallel.

Figure 5:
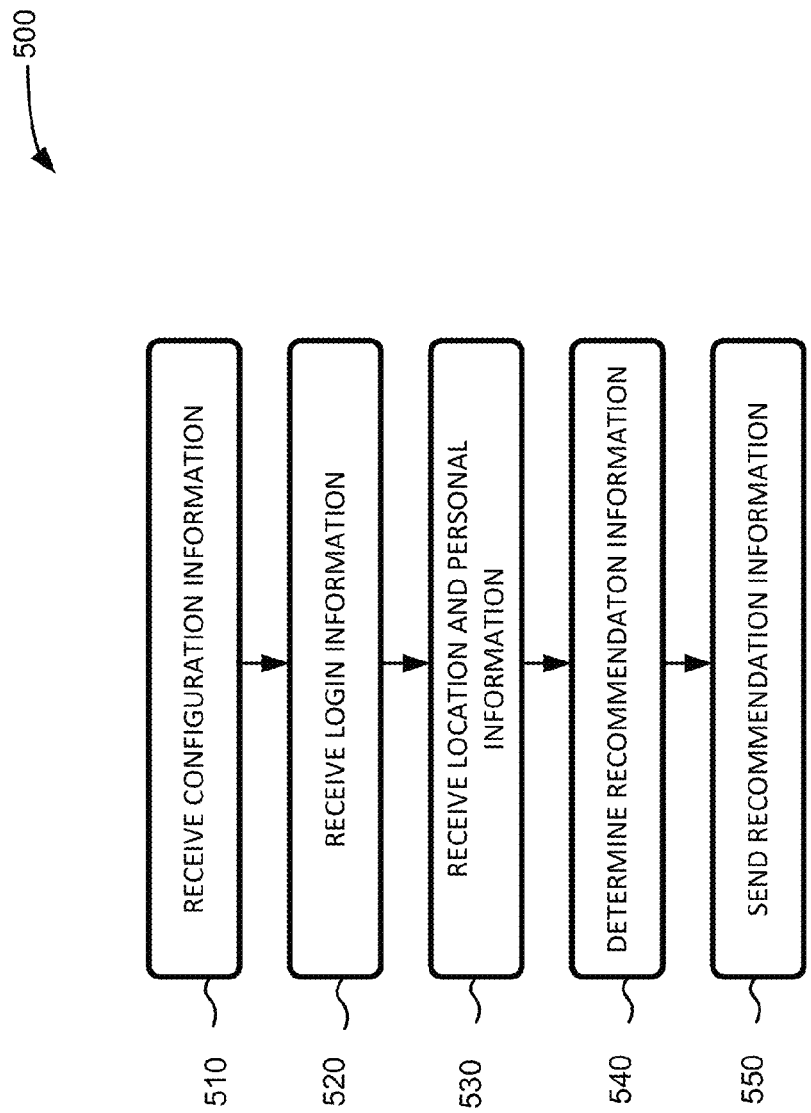
FIG. 5 is a flow chart of an example process for using information from one or more applications.

FIG. 5 is a flow chart of an example process 500 for using information from one or more applications. In one implementation, process 500 may be performed by proxy gateway 270. In another example implementation, one or blocks of process 500 may be performed by one or more other devices, such user device 210.

Process 500 may include receiving configuration information (block 510). For example, proxy gateway 270 may receive configuration information from proxy application 205, described with regard to block 410 in FIG. 4. Proxy gateway 270 may use the configuration information for one or more different purposes. In some implementations, proxy gateway 270 may use the configuration information to determine what information may be stored by proxy gateway 270 and for how long the information may be stored by proxy gateway 270. For example, the configuration information may indicate a preference by the user (of user device 210) to permit location information and personal information to be stored for no more than a specified time (e.g., personal information cannot be stored for more than 14 days, 19 days, 7 days, etc.). Further, the proxy gateway 270 may, based on the configuration information, store information based on the user's interests, friends, contacts, photos, videos, and/or other types of personal information.

Process 500 may include receiving login information (block 520). For example proxy gateway 270 may receive the login information associated with proxy application 205. Proxy gateway 270 may validate the login information based upon matching the received login information with valid login information stored by proxy gateway 270. Alternatively, proxy gateway 270 may send the login information to another network device (e.g., HSS/AAA server 240) and request the other network device to validate the login information. Once the other network device validates the login information, the other network device may send a message to proxy gateway 270 that the login information is valid.

Process 500 may include receiving location and personal information (block 530). For example, proxy gateway 270 may receive, from user device 210, the location information of user device 210 and the personal information associated with social networking applications downloaded on user device 210, as described with regard to FIG. 4. Proxy gateway 270 may send the location information and the personal information to social networking servers 290 associated with one or more social networking applications downloaded on user device 210. Additionally, proxy gateway 270 may receive information associated with a request from the user (of user device 210) requesting a recommendation and/or other types of information.

Process 500 may include determining recommendation information (block 540). Proxy gateway 270 may determine a recommendation based on a request by the user or by information stored by proxy gateway 270 to send recommendations based on the configuration information described with regard to FIG. 4.

Proxy gateway 270 may use different types of information (stored by proxy gateway 270) to make one or more recommendations based on the user's levels of permission and preferences within the configuration information described with regard to FIG. 4. For example, proxy gateway 270 may use information (received from proxy application 205 and stored by proxy gateway 270) associated with locations that the user has recently visited within a period of time (e.g., in the last week, the previous month, the last 2 days, etc.).

Additionally, or alternatively, proxy gateway 270 may use information associated with communications between the user and the user's friends (e.g., communication information received from one or more social networking applications, via proxy application 205, which may include information about a friend's location, shared interests, shared experiences such as music concert, etc.). Additionally, or alternatively, proxy gateway 270 may use information (received from one or more social networking applications via proxy application 205 and stored by proxy gateway 270) associated with the user's interests, such as the user's interest in different types of music, television programs, concerts, movies, politics, sports, and/or other types of interests. Additionally, or alternatively, proxy gateway 270 may use information (received from one or more social networking applications via proxy application 205 and stored by proxy gateway 270) associated with the user's status, such as whether the user is married, single, dating, and/or any other type of status.

Proxy gateway 270 may receive and use location information to determine the recommendation. For example, assume that proxy gateway 270 determines, based upon the above information, that the user may be interested in an ice-cream store. In one example implementation, proxy gateway 270 may have access to a library and/or database of information regarding businesses and other types of organizations (e.g., schools, government facilities, etc.) and the location of the businesses that proxy gateway 270 may use to find an ice-cream store near the location of user device 210. In another example implementation, proxy gateway 270 may communicate with another network device to request and receive the information.

In either of the above example implementations, proxy gateway 270 and/or another network device may store a hierarchical list of businesses and/or other organizations. Businesses and/or other organizations may pay a fee to the network service provider (associated with proxy gateway 270) to be selected by proxy gateway and/or another network device by being listed at a higher level in the hierarchical list than the other similar businesses and/or organizations. For example, a bookstore located in Miami may pay a fee (to the network service provider) to be selected instead of other bookstores in Miami if proxy gateway 270 is making a recommendation (based on the user's personal information and the location of user device 210) for bookstores in Miami.

Process 500 may include sending the recommendation information (block 550). For example, proxy gateway 270 may send the recommendation information to proxy application 205.

While a series of blocks has been described with regard to FIG. 5, the blocks and/or the order of the blocks may be modified in other implementations. Further, non-dependent blocks may be performed in parallel.

Figure 6C:
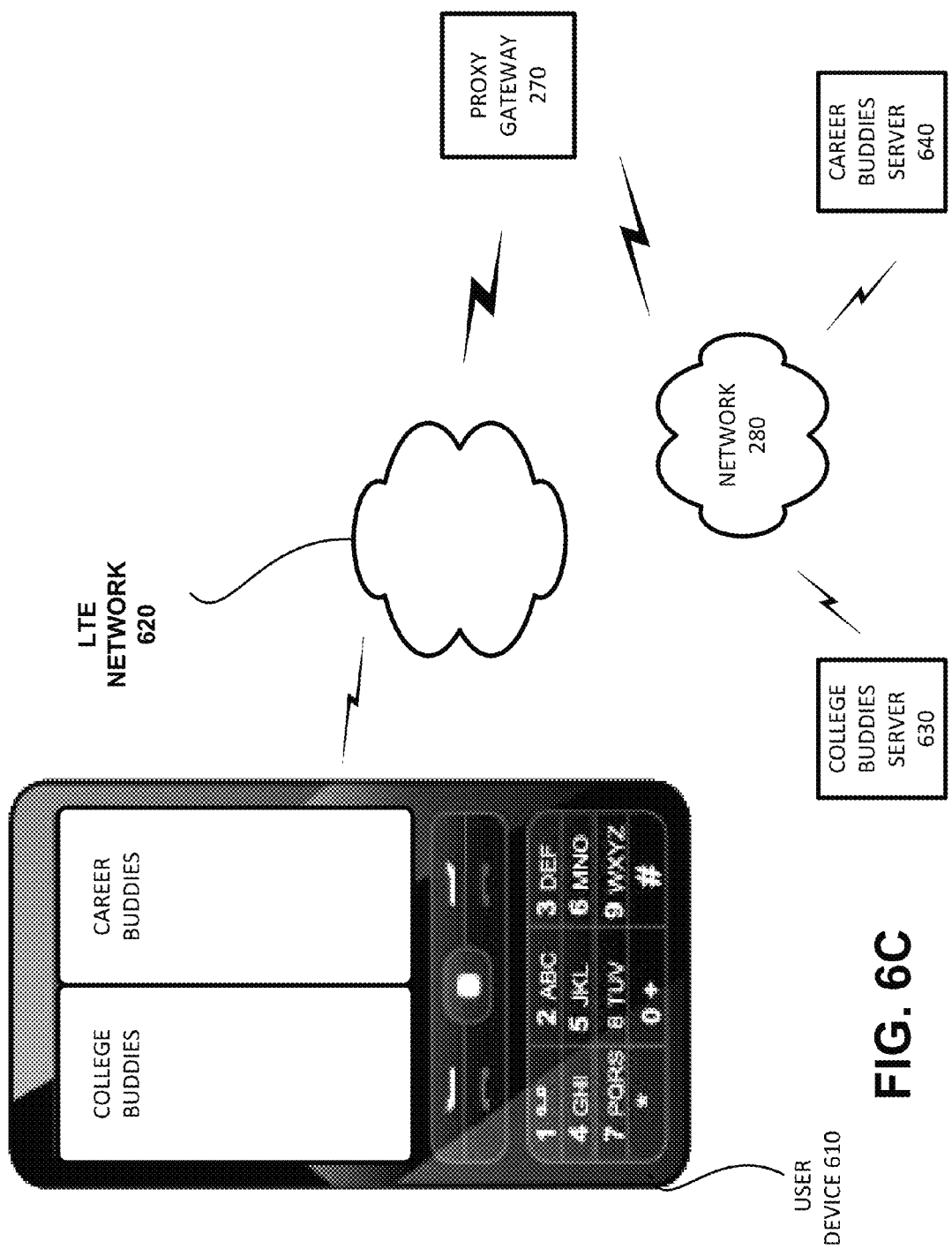

FIGS. 6A-6D are diagrams of example processes for using personal and location information. FIGS. 6A and 6B show proxy application 205, and a user device 610. An example of user device 610 may correspond to user device 210, described with regard to FIG. 2. As shown in FIG. 6A, a user ("Ben"), of user device 610, may decide to log into proxy application 205. Ben uses proxy application 205 to log into several different social networking applications (downloaded on user device 210) at the same time. Ben enters a user name and a password for proxy application 205. Assume that proxy application 205 determines that the user name and password are valid. As shown in FIG. 6B, proxy application 205 displays a message on user device 210 indicating that Ben is now logged into two applications: College Buddies and Career Buddies (two different social networking applications).

FIG. 6C shows user device 610, LTE network 620, proxy gateway 270, network 280, College Buddies server 630, and Career Buddies server 640.

An example of LTE network 620 may correspond to one or more devices (e.g., base station 220, SGW 230, MME 240, PGW 250, and CSCF server 265) that make up the access, EPS, and IMS core segments, described with regard to FIG. 2. An example of College Buddies server 630 and an example of Career Buddies server 640 may each correspond to social networking server 290, described with regard to FIG. 2.

As shown in FIG. 6C, Ben is using College Buddies and Career Buddies. Ben is using College Buddies to communicate with his fellow alumni at Top College. Ben is using Career Buddies to communicate with former co-workers about the best pubs in Houston. As Ben is using College Buddies and Career Buddies, Ben is visiting Houston. Proxy application 205 (not shown in FIG. 6C) may receive information from College Buddies and Career Buddies and send the information, via LTE network 620, to proxy gateway 270. Additionally, proxy application 205 may receive the location information via a GPS receiver within user device 610. Assume that proxy application 205 has instructions to send location information every 5 minutes while Ben is using the College Buddies application or the Career Buddies application. Proxy application 205 may send the location information, via LTE network 620, to proxy gateway 270. By sending the location information every 5 minutes, instead of each social networking application sending its own location information from user device 610, the amount of resources of user device 610 dedicated to sending location information is reduced since location information is being sent less frequently than would occur if each social networking application sent its own location information.

Proxy gateway 270 may receive the personal information (associated with the College Buddies application) and the Career Buddies application and the location information. Proxy gateway may send information associated with College Buddies to College Buddies server 630 and send information associated with Career Buddies to Career Buddies server 640. Additionally, proxy gateway 270 may store the personal and location information and determine (based on the personal and location information) to send a recommendation to user device 610 that may be relevant to Ben.

Figure 6D:
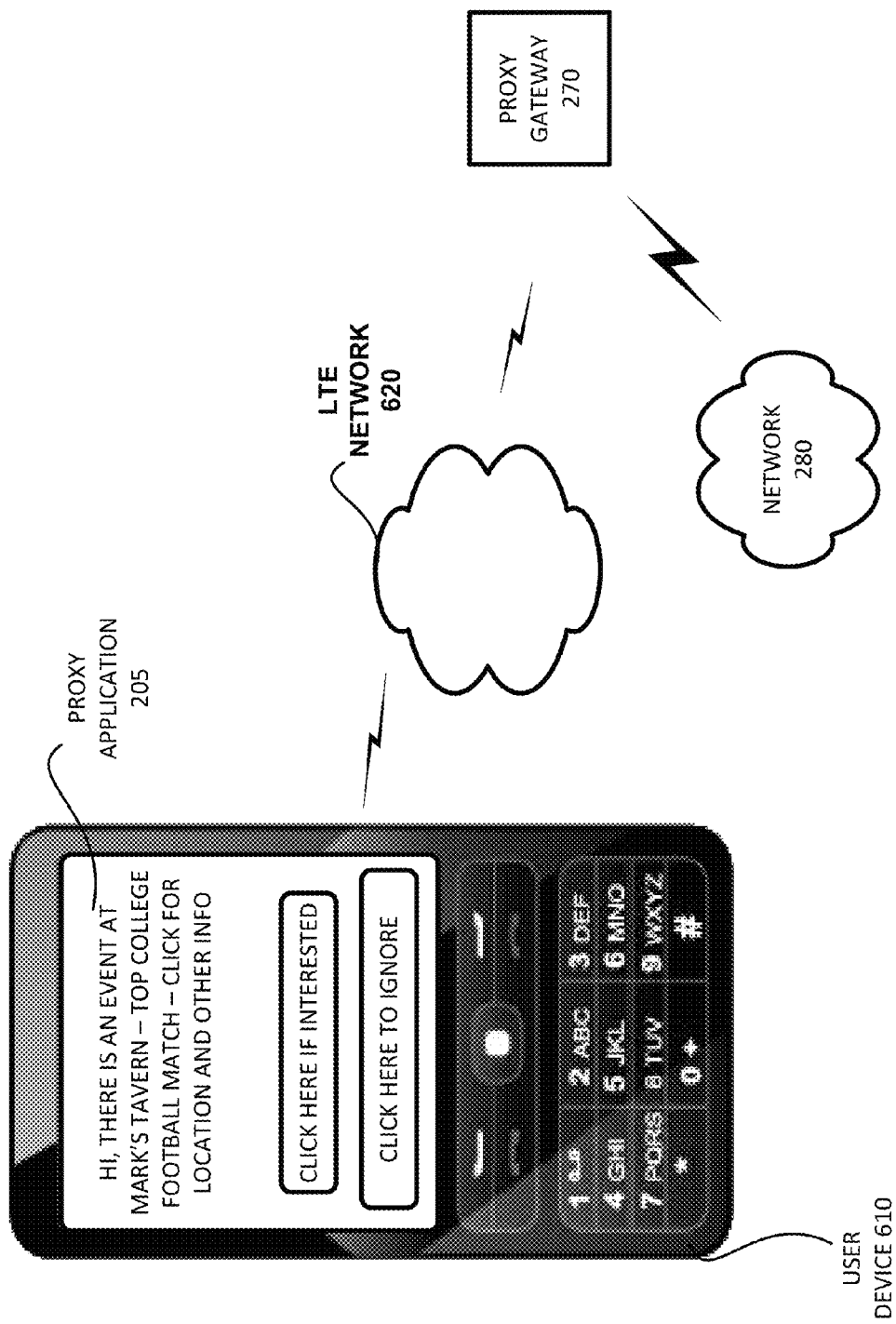

As shown in FIG. 6D, proxy gateway 270 may send the recommendation to proxy application 205. Proxy application 205 may receive the message and display the message (on user device 210) to Ben. The message may include information about a football match between Top College and their rival Second College that is being televised at an event at Mark's Tavern. Mark's Tavern is a pub located 3 miles from Ben's current location. The message may provide Ben the option to either obtain the location and other information about the event or the option to ignore the information if Ben is not interested in going to Mark's Tavern.

Systems and/or methods described herein may permit an application downloaded on a user device to control when location information of the user device can be sent from the user device (through a network) to a network device. As a result, controlling the frequency of time during which the location information (of the user device) is sent from the user device may reduce the amount of user device resources and/or reduce the amount of network resources being used to send the location information since less location information is being sent from the user device.

The foregoing description of implementations provides illustration and description, but is not intended to be exhaustive or to limit the implementations to the precise form disclosed. Modifications and variations are possible in light of the above disclosure or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A system comprising:
a network device to:
send, to an application downloaded on a user device, frequency information identifying a frequency of time at which the application is to send geographic location information to the network device,
the frequency of time identifying a time period at which the application is to send the geographic location information to the network device,
the geographic location information identifying a geographic location of the user device, and
the user device sending, based on the frequency information, the geographic location information to the network device at the frequency of time;
receive personal information, associated with a plurality of social networking applications, from the application on the user device;
receive the geographic location information from the application at the frequency of time,
the frequency of time being less than frequencies of time at which the plurality of social networking applications request the user device to send the geographic location information to a plurality of social networking servers associated with the plurality of social networking applications; and
send the personal information and the geographic location information to the plurality of social networking servers.

2. The system of claim 1, where the network device is further to:
send a request, to the application, identifying a particular frequency of time at which the application is to send the geographic location information to the network device, the particular frequency of time being different than the frequency of time; and
receive the geographic location information from the application based on the particular frequency of time.

3. The system of claim 1, where the network device is further to:
determine a recommendation based on the personal information and the geographic location information received from the application on the user device; and
send the recommendation to the application on the user device.

4. The system of claim 1, where the network device is further to:
receive a request indicating that a particular recommendation is to be sent during a particular period of time;
generate the particular recommendation based on receiving the request that the particular recommendation is to be sent during the particular period of time; and
send the particular recommendation during the particular period of time.

5. The system of claim 1, where the network device is further to:
send a request to the application indicating that the geographic location information is only to be sent when a particular social networking application, of the plurality of social networking applications, is being used on the user device,
the application sending, based on the request, the geographic location information when the particular social networking application is being used on the user device; and
receive the geographic location information from the application.

6. The system of claim 1, where the network device is further to:
send a request, to the application, identifying a particular frequency of time at which the application is to send the geographic location information to the network device and identifying a period of time,
the particular frequency of time being different than the frequency of time,
the application sending, based on the request, the geographic location information at the particular frequency of time during the period of time; and
receive the geographic location information from the application.

7. A method comprising:
sending, by a network device, frequency information to an application downloaded on a user device,
the frequency information identifying a frequency of time at which the application is to send geographic location information to the network device,
the frequency of time identifying a time period at which the application is to send the geographic location information to the network device,
the geographic location information identifying a geographic location of the user device, and
the application sending, based on the frequency information, the geographic location information to the network device at the frequency of time;
receiving, by the network device, the geographic location information from the application at the frequency of time,
the frequency of time being less than frequencies of time at which a plurality of social networking applications, executing on the user device, request the user device to send the geographic location information to a plurality of social networking servers associated with the plurality of social networking applications;
receiving, by the network device, personal information associated with the plurality of social networking applications;
sending, by the network device, the personal information and the geographic location information to the plurality of social networking servers;
determining, by the network device, a recommendation based on the personal information and the geographic location information; and
sending, by the network device, the recommendation to the application on the user device.

8. The method of claim 7, further comprising:
receiving a request, from the user device, that the network device is to receive additional personal information associated with an additional social networking application;
receiving, based on the request, the additional personal information associated with the additional social networking application; and
sending another recommendation based on the additional personal information.

9. The method of claim 7, further comprising:
receiving a request, from the user device, that the recommendation is not be sent to the user device during a period of time; and
where sending the recommendation includes:
sending, based on the request, the recommendation during a time outside of the period of time.

10. The method of claim 7, further comprising:
sending a request, to the user device, identifying a particular frequency of time at which the application is to send the geographic location information to the network device and indicating that the application is to send the geographic location information, at the particular frequency of time, when a particular social networking application, of the plurality of social networking applications, is being used on the user device,
the particular frequency of time being different than the frequency of time,
the application sending, based on the request, the geographic location information when the particular social networking application is being used on the user device and according to the particular frequency of time; and
receiving the geographic location from the application.

11. The method of claim 7, further comprising:
sending an instruction to the user device,
the instruction identifying a particular frequency of time at which the application is to send the geographic location information to the network device and indicating that the application is to send the geographic location information to the network device when the user device is being used during a period of time,
the particular frequency of time being different than the frequency of time, and
the application sending, based on the instruction, the geographic location information at the particular frequency of time during the period of time; and
receiving the geographic location information from the application.

12. A non-transitory computer-readable medium for storing instructions, the instructions comprising:
one or more instructions that, when executed by one or more processors, of a user device, cause the one or more processors to:
receive login information that is used for logging into a plurality of social networking applications downloaded on the user device;
receive personal information associated with the plurality of social networking applications;
send the personal information to a network device;
determine geographic location information,
the geographic location information identifying a geographic location of the user device;
identify, based on information stored by the user device, a frequency of time at which the user device is to send the geographic location information to the network device,
the frequency of time identifying a time period at which the user device is to send the geographic location information to the network device, and
the frequency of time being less than frequencies of time at which the plurality of social networking applications request the user device to send the geographic location information to a plurality of social networking servers associated with the plurality of social networking applications; and
send the geographic location information to the network device, based on the frequency of time,
the network device relaying the geographic location information to the plurality of social networking servers on behalf of the plurality of social networking applications.

13. The non-transitory computer-readable medium of claim 12, where the instructions further comprise:
one or more instructions that, when executed by the one or more processors, cause the one or more processors to:
send a request, to the network device, indicating that a recommendation is to be sent to the user device only when a particular social networking application, of the plurality of social networking applications, is being used on the user device for a time greater than a threshold amount of time,
the network device sending the recommendation, based on the request, only when the particular social networking application is used on the user device for the time greater than the threshold amount of time; and
receive the recommendation from the network device.

14. The non-transitory computer-readable medium of claim 12, where the instructions further comprise:
one or more instructions that, when executed by the one or more processors, cause the one or more processors to:
send a request, to the network device, indicating that particular geographic location information, collected during a particular period of time, not be stored by the network device;
send the particular geographic location information to the network device,
the network device not storing the particular geographic location information based on the request, and creating a recommendation using the geographic location information and not using the particular geographic location information; and
receive the recommendation from the network device.

15. The non-transitory computer-readable medium of claim 12, where the instructions further comprise:
one or more instructions that, when executed by the one or more processors, cause the one or more processors to:
send a request, to the network device, indicating that particular personal information from a particular social networking application, of the plurality of social networking applications, not be stored by the network device;
send the particular personal information to the network device,
the network device not storing the particular personal information based on the request, and creating a recommendation using the personal information and not using the particular personal information; and receive the recommendation from the network device.

16. The non-transitory computer-readable medium of claim 12, where the instructions further comprise:

one or more instructions that, when executed by the one or more processors, cause the one or more processors to:

send a request, to the network device, indicating that particular personal information associated with a particular social networking application, of the plurality of social networking applications, is only to be stored by the network device for a particular amount of time;

send the particular personal information to the network device, the network device creating, based on the request, a recommendation using the particular personal information during the particular amount of time that the particular personal information is stored by the network device; and receive the recommendation from the network device.

17. The non-transitory computer-readable medium of claim 12, where the instructions further comprise:

one or more instructions that, when executed by the one or more processors, cause the one or more processors to:

receive a request identifying a particular frequency of time at which the geographic location information is to be sent from the user device to the network device, the particular frequency of time being different than the frequency of time; and send the geographic location information to the network device based on the particular frequency of time.

18. A device comprising:

a memory to store instructions; and a processor to execute the instructions to:

receive personal information associated with a plurality of social networking applications;

send the personal information to a network device;

determine geographic location information, the geographic location information identifying a geographic location of the device;

identify, based on information stored by an application downloaded on the device, a frequency of time at which the application is to send the geographic location information to the network device, the frequency of time identifying a time period at which the application is to send the geographic location information to the network device, and the frequency of time being less than frequencies of time at which the plurality of social networking applications request the device to send the geographic location information to a plurality of social networking servers associated with the plurality of social networking applications; and send the geographic location information to the network device based on the frequency of time, the network device relaying the geographic location information and the personal information to the plurality of social networking servers on behalf of the plurality of social networking applications.

19. The device of claim 18, where the processor is further to:

send a request, to the network device, indicating that particular personal information associated with a particular social networking application, of the plurality of social networking applications, is only to be stored by the network device for a particular amount of time;

send the particular personal information to the network device, the network device storing, based on the request, the particular personal information for a particular amount of time and creating a recommendation based on the particular personal information during the particular amount of time that the particular personal information is stored by the network device; and receive the recommendation from the network device.

20. The device of claim 18, where the processor is further to:

send a request, to the network device, indicating that a recommendation is to be sent to the device only when a particular social networking application, of the plurality of social networking applications, is being used on the device for a time greater than a threshold amount of time, the network device sending, based on the request, the recommendation only when the particular social networking application is used on the device for the time greater than the threshold amount of time; and receive the recommendation from the network device.

* * * * *